United States Patent [19]

Mortimer

[11] 4,303,920
[45] Dec. 1, 1981

[54] RADAR SYSTEMS

[75] Inventor: Alan K. Mortimer, Shanklin, England

[73] Assignee: Plessey Handel und Investments AG, Zug, Switzerland

[21] Appl. No.: 73,241

[22] Filed: Sep. 6, 1979

[30] Foreign Application Priority Data

Sep. 9, 1978 [GB] United Kingdom ............... 36243/78
Sep. 25, 1978 [GB] United Kingdom ............... 38030/78

[51] Int. Cl.³ ............................................. G01S 13/10
[52] U.S. Cl. ...................... 343/17.1 R; 343/17.1 PW; 343/17.2 R
[58] Field of Search ................. 343/17.1 R, 17.1 PW, 343/17.2 R

[56] References Cited

U.S. PATENT DOCUMENTS

| | | | |
|---|---|---|---|
| 2,995,747 | 8/1961 | Easy et al. ...................... | 343/17.1 R |
| 3,016,531 | 1/1962 | Tomiyasu et al. ............. | 343/17.1 R |
| 3,266,038 | 8/1966 | Milne et al. .................... | 343/17.2 R |
| 4,060,807 | 11/1977 | Barton ............................ | 343/17.1 R |
| 4,155,088 | 5/1979 | Taylor, Jr. et al. ........ | 343/17.2 R X |

*Primary Examiner*—T. H. Tubbesing
*Attorney, Agent, or Firm*—Fleit & Jacobson

[57] ABSTRACT

A radar system including an antenna adapted to provide two beams one of which covers a higher elevation than the other, and means for producing two successive radar pulses one of which is longer than the other, a switch for selecting in dependence upon range the beam required and for selecting a predetermined pulse length for use therewith so that when receiving signals from short ranges the shorter pulse is used with the higher beam only and when receiving signals from longer ranges the longer pulse is used with the lower beam only and at intermediate ranges the shorter pulse is used with the lower beam while the longer pulse is used with the higher beam.

7 Claims, 2 Drawing Figures

FIG. I.

RADAR SYSTEMS

This invention relates to radar systems.

It is desirable to provide a radar system which affords good target detection at short range for various altitudes whilst being capable of detecting targets at long range. It is well known that radar coverage is dependent upon antenna design and some known systems provide two antenna arrangements which in combination afford good target detection at various ranges and altitudes. It is also known that radar performance is dependent upon radar pulse length and that at long ranges a longer pulse having more energy is desirable. However with presently proposed systems, in order to provide for optimum target detection at different rnages and altitudes, a number of radar channels are required, which involves considerable duplication of hardware and is therefore correspondingly expensive.

According to the present invention a radar system includes an antenna adapted to provide two beams one of which covers a higher elevation than the other, and means for producing two successive radar pulses one of which is longer than the other, switch means for selecting in dependence upon range the beam required and for selecting a predetermined pulse length for use therewith so that when receiving signals from short ranges the shorter pulse is used with the higher beam only and when receiving signals from longer ranges the longer pulse is used with the lower beam only and at intermediate ranges the shorter pulse is used with the lower beam whilst the longer pulse is used with the higher beam.

By using the system according to the present invention, at short ranges the shorter pulse affords good resolution and the higher beam minimises signals received from ground clutter. At longer ranges a longer pulse increases the energy available to the radar and the lower beam affords good radar cover at angles near to the horizon and at ranges where clutter is not present. At intermediate ranges the low beam is used with the short pulse to detect targets near the ground to minimise the amount of clutter received whilst the high beam is used with the longer pulse to increase the energy available to detect high flying targets.

Echo signals are not received until both pulses have been transmitted and so the short pulse is preferably transmitted secondly so that short range data can be received as soon as the short pulse finishes. The pulses are preferably contiguous.

In some embodiments of the invention both the longer and the shorter pulses are used with the higher beam at shorter range which affords more energy to detect targets at high elevation.

In another embodiment of the invention, both the longer and the shorter pulses are used with the lower beam at longer ranges further to increase the energy available to detect distant targets. Thus it will be appreciated from the accompanying specific description wherein reference is made to the accompanying drawings that two channels of signal processing only are required to make maximum use of signals from four sets of received data.

In order to distinguish between the shorter and longer pulses for signal processing purposes in a receiver, the long and short pulses are in the present example transmitted at different frequencies whereby they may be received, filtered and passed through separate receiving channels.

A system according to one embodiment of the present invention may comprise an antenna having a main feed for transmission and reception and an auxiliary feed for reception only, the main feed being fed from a radar transmitter via a duplexer, received signals being passed via the duplexer to a main receiving channel, a similar auxiliary receiving channel being coupled to the auxiliary feed, the transmitter being capable of transmitting successive radar pulses at frequencies F1 and F2 and the receiving channels each including a filter responsive to the frequencies F1 and F2, output signals from the filters being fed to a switch arrangement for providing output signals to respective channels for processing in dependence upon range.

An exemplary embodiment of the invention will now be described with reference to the accompanying drawings in which:

FIG. 1 is a generally schematic block circuit diagram of a part of a radar system, and wherein;

Figure 1:
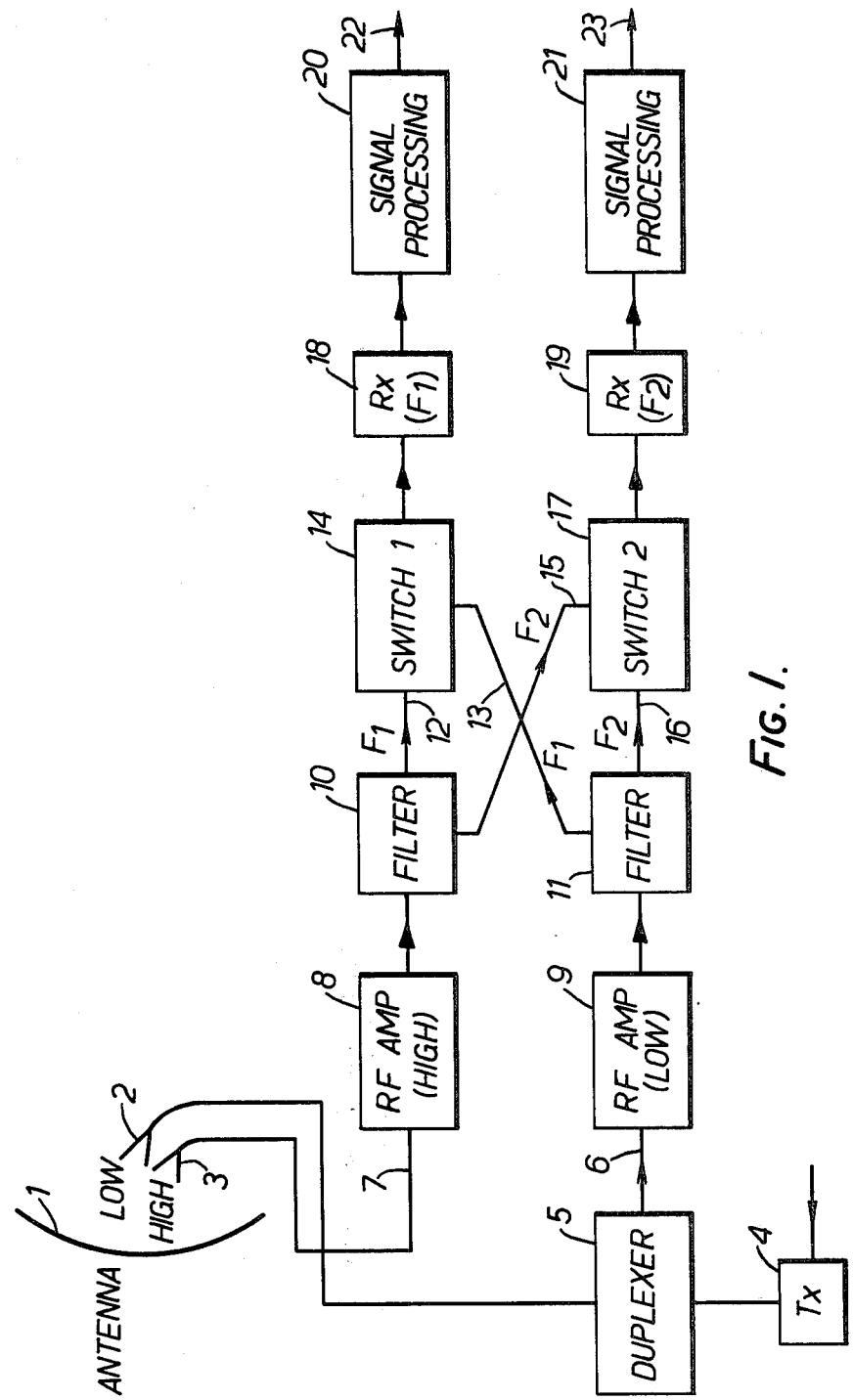

Referring now to FIG. 1, the system comprises an antenna having a reflector 1 and a pair of feeds associated therewith 2 and 3. The feed 2 is fed with radar signals from transmitter 4 via a duplexer 5. The transmitter is adapted to provide in quick succession two contiguous radar pulses at different frequencies and of different lengths, the shorter of the two pulses being transmitted secondly. After the transmission of the radar pulses, echo signals are received by the antenna feed 2 which is regarded as the main feed and passed to a main processor channel on line 6 via duplexer 5. Signals received by the feed 3 which is regarded as the auxiliary feed are passed via line 7 to an auxiliary processing channel. Signals on the line 7 are fed in the auxiliary channel to an R.F. amplifier 8 whilst received signals on line 6 in the main channel are fed to an amplifier 9. The amplifiers 8 and 9 are arranged to feed filters 10 and 11 respectively which are effective to separate signals at the frequencies F1 and F2. Signals at the frequency F1 from the filters 10 and 11 are fed on lines 12 and 13 respectively to a switch unit 14, whilst signals at the frequency F2 are fed via the filters 10 and 11 respectively on the lines 15 and 16 to the switch unit 17. Switch unit 14 feeds a receiver 18 including intermediate frequency processing and amplification circuitry responsive to the frequency F1 whilst the switch unit 17 feeds a similar receiver 19 responsive to the frequency F2. The receivers 18 and 19 are arranged to feed signal processors 20 and 21 respectively from which output signals indicative of a target are provided on lines 22 and 23 respectively.

Figure 2:
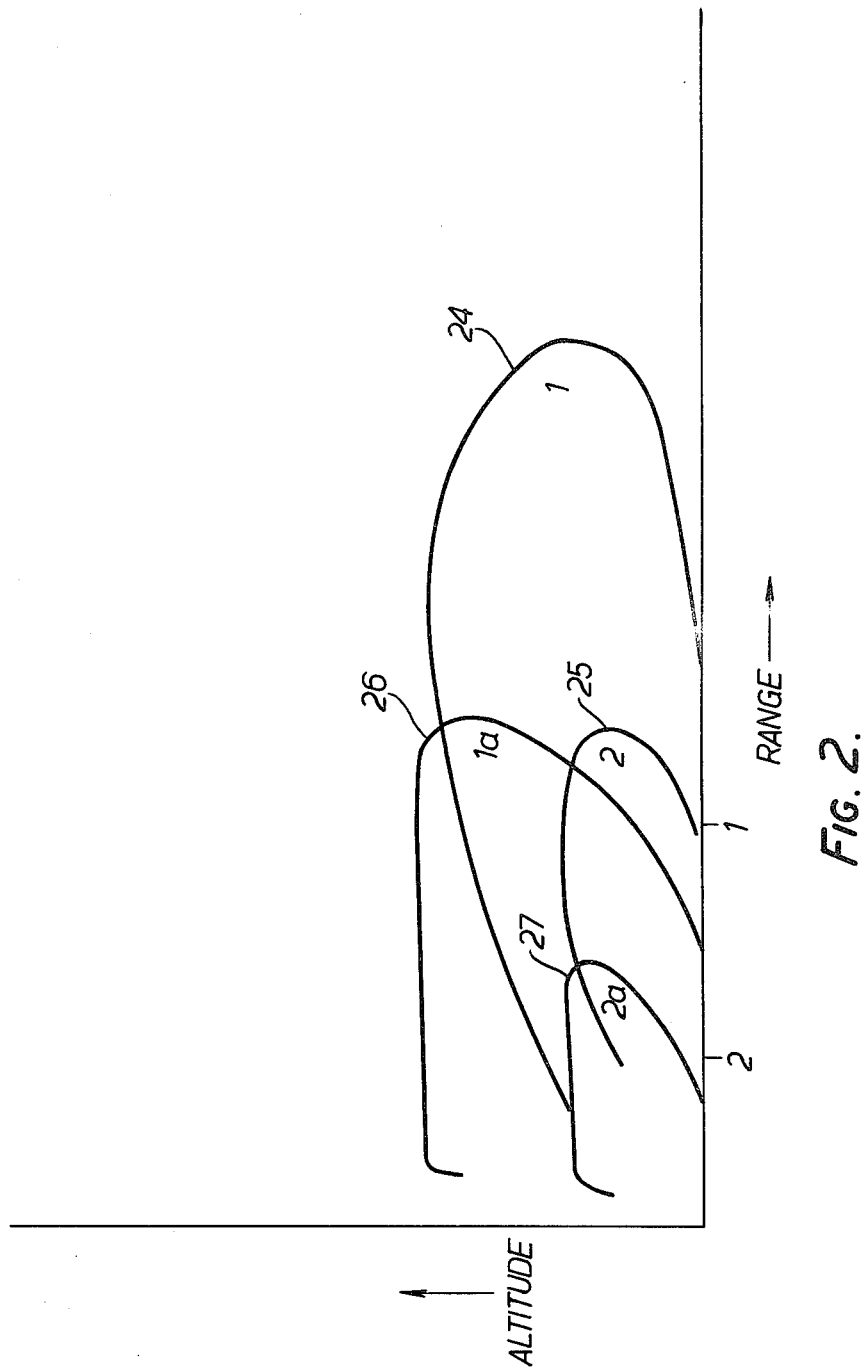
FIG. 2 is a graph showing the range/altitude coverage afforded by different antenna arrangements when fed with radar pulses of different lengths.

The antenna feed 2 provides echo signals from lower altitude targets than the antenna feed 3 and this is best appreciated by referring now to the graphs shown in FIG. 2. It will be assumed for the purposes of the following explanation that a longer radar pulse is transmitted at the frequency F1 which is lower than the frequency F2. In the present embodiment the radar frequencies for F1 and F2 might be 1300 MHz and 1340 MHz respectively whilst the pulse length for F1 and F2 might typically be 6 $\mu$sec. and 1 $\mu$secs. When the main antenna 2 is receiving echos of the longer pulse at F1, a range/altitude graph 24 will obtain as shown in FIG. 2. When the main antenna 2 is fed with the shorter pulse at the frequency F2 then a coverage as shown by graph 25 will obtain. If the longer pulse is received at the auxiliary antenna 3, then a much higher altitude coverage will be obtained as shown by the graph 26 in FIG. 2 and if the auxiliary antenna 3 is fed with a shorter pulse at the frequency F2 then coverage will obtain as shown in graph 27.

The switch units 14 and 17 are arranged so that one or other of the signals fed thereto are routed to the signal processing circuitry and there is also provided the facility for switching the signal off. Operation of the switch units 14 and 17 in dependence upon range is effected as follows. Up to the range of 30 nautical miles in the present embodiment of the invention the shorter pulse which is transmitted at frequency F2 only, is fed from the auxiliary feed 3 which has the higher altitude response. Thus it is arranged that no signals are passed through the switch unit 14, whilst switch unit 17 passes signals at the frequency F2 from the filter 10 which is fed from the auxiliary antenna 3, these signals being passed by the receiver 19 and the signal processor 21 to output terminal 23.

At intermediate ranges, say between 30 and 70 nautical miles, signals at the frequency F2 which is the shorter pulse, are fed from the main antenna 2 via the switch unit 17 to provide an output signal on the line 23 and signals at the frequency F1 are fed from the auxiliary antenna 3 via the switch unit 14 to provide an output signal on the terminal 22. At ranges in excess of 70 nautical miles the switch units 14 and 17 are again operated so that no signals are outputed from the switch unit 17 at the frequency F2 whereas signals at the frequency F1 and originating from the main antenna 2 are routed via the switch unit 14, the receiver 18, and the signal processor 20 to provide an output signal on the terminal 22.

It will be appreciated from the foregoing explanation that two signal processing channels only are provided andthat by operating the switch units 14 and 17 in accordance with the range desired, the effective aerial feed and pulse length are selected to provide appropriate output signals at the terminals 22 and 23.

In an alternative embodiment of the invention, both the longer and the shorter pulses at F1 and F 2 respectively are used with the auxiliary feed at ranges of up to 30 nautical miles. In a further alternative embodiment which may be used in addition to or in combination with the first embodiment, the longer and shorter pulses at frequencies F1 and F2 respectively are used with signals from the main feed 2 at ranges in excess of 70 nautical miles whereby a further increase in the energy available is provided to detect distance targets.

What I claim is:

1. A radar system including an antenna adapted to provide two beams, one of which covers a higher elevation than the other, producing means for producing two successive radar pulses, one of which is longer than the other, and switch means for selecting in dependence upon range the beam required and for selecting a predetermined pulse length for use therewith so that, when receiving signals from short ranges, said switch means provides the shorter pulse for use with the higher beam only, and, when receiving signals from longer ranges, the switch means provides the longer pulse for use with the lower beam only, and wherein, at intermediate ranges, the switch means provides the shorter pulse for use with the lower beam and provides the longer pulse for use with the higher beam.

2. A radar system as claimed in claim 1, wheren said producing means comprises means for transmitting the shorter pulse after the longer pulse.

3. A radar system as claimed in any one of claims 1 or 2, wherein said producing means comprises means for producing two contiguous pulses.

4. A radar system as claimed in claim 1, wherein said switch means comprises means for providing the longer pulse and the shorter pulse for use with the higher beam at short range, thereby to afford more energy to detect targets at high elevation.

5. A radar system as claimed in claim 1, wherein said switch means comprises means for providing both the longer and the shorter pulses for use with the lower beam at longer ranges, thereby to increase the energy available to detect distant targets.

6. A radar system as claimed in claim 1, wherein said producing means comprises means for transmitting the longer and shorter pulses at different frequencies, said system including filter means for filtering received echo signals, said received filtered echo signals being passed through separate receiving channels in accordance with frequency.

7. A radar system as claimed in claim 1, wherein said antenna comprises a main feed for transmission and reception and an auxiliary feed for only, the main feed being fed from the radar transmitter via a duplexer, received signals being passed via the duplexer to a mian receiving channel, an auxiliary receiving channel being coupled to the auxiliary feed, the transmitter being capable of transmitting successive radar pulses at frequencies F1 and F2, and the receiving channels each including a filter responsive to the frequencies F1 and F2, output signals from the filters in each channel being fed to the switch means for providing output signals to respective channels for processing in dependence upon range.

* * * * *